United States Patent Office 3,723,248
Patented Mar. 27, 1973

3,723,248
METHOD FOR PRODUCING α-KETOGLUTARIC ACID
Katsunobu Tanaka and Kazu Kimura, Machida-shi, and Ken Yamaguchi, Tokyo, Japan, assignors to Kyowa Hakko Kogyo Co., Ltd., Tokyo, Japan
No Drawing. Continuation of application Ser. No. 657,483, Aug. 1, 1967, which is a continuation-in-part of application Ser. No. 470,883, July 9, 1965, both now abandoned. This application June 13, 1968, Ser. No. 736,582
Int. Cl. C12d 1/02
U.S. Cl. 195—28 R
15 Claims

ABSTRACT OF THE DISCLOSURE

The present disclosure relates to a method for producing α-ketoglutaric acid which comprises culturing a microorganism capable of producing α-ketoglutaric acid in an aqueous nutrient medium under aerobic conditions in the presence of at least one hydrocarbon as the main source of carbon. The microorganisms capable of producing α-ketoglutaric acid advantageously belong to the genera Corynebacterium, Brevibacterium, Arthrobacter and Micrococcus and the hydrocarbons which are used as the main source of carbon are preferably n-paraffins.

CROSS-REFERENCE TO RELATED APPLICATION

This application is a continuation application of copending application Ser. No. 657,483, filed on Aug. 1, 1967, which is a continuation-in-part of application Ser. No. 470,883, filed in the United States Patent Office on July 9, 1965, both now abandoned.

The present invention relates to a process for producing α-ketoglutaric acid. More particularly, the present invention concerns a process for producing α-ketoglutaric acid by fermentation in the presence of hydrocarbons, for example n-paraffins, as the main source of carbon.

α-Ketoglutaric acid has been used for a long time in the production of glutamic acid. However, the production of α-ketoglutaric acid by a fermentation process has not been commercialized up to the present time because of the discovery of the direct fermentation method for manufacturing glutamic acid. However, in recent years it has been discovered that α-ketoglutaric acid can be utilized as a raw material for organic synthesis, other than for the manufacture of glutamic acid. Therefore, there is little doubt that if an inexpensive and effective method of manufacturing α-ketoglutaric acid can be developed, said acid would be a very useful compound in various organic syntheses. For example, α-ketoglutaric acid is effective in amino acid metabolism (transamination), and as an important reactant in biological oxidations and reductions.

The production of α-ketoglutaric acid from carbohydrates as raw materials has already been discovered in various microorganisms. However, carbohydrate materials are very expensive. In addition, when cane molasses which is an inexpensive raw material is used, disadvantages such as a low accumulated concentration, formation of secondary products, as well as a difficulty in the separation of α-ketoglutaric acid from the fermentation medium are encountered. Accordingly, investigations have been conducted in an effort to discover a commercial and effective process for the manufacture of α-ketoglutaric acid.

One of the objects of the present invention is to provide an improved process for the preparation of α-ketoglutaric acid which overcomes the disadvantages and deficiencies of the prior art methods.

Another object of the present invention is to provide a process for producing α-ketoglutaric acid by fermentation in the presence of hydrocarbons as the main carbon source which may be carried out in an efficacious and simple manner.

A further object of the present invention is to provide a process for the preparation of α-ketoglutaric acid by fermentation which may be carried out advantageously on an industrial scale to give a high yield of product.

Other objects and further scope of applicability of the present invention will become apparent from the detailed description given hereinafter; it should be understood, however, that the detailed description and specific examples, while indicating preferred embodiments of the present invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved product and process for producing α-ketoglutaric acid may be obtained by culturing a microorganism capable of producing α-ketoglutaric acid in an aqueous nutrient medium under aerobic conditions in the presence of at least one hydrocarbon as the main carbon source. The α-ketoglutaric acid is accumulated in substantial quantities in the fermentation medium and separated from said medium by conventional methods.

The microorganisms capable of producing α-ketoglutaric acid include those which belong to the family Brevibacteriaceae, Micrococcaceae and Corynebacteriaceae, said microorganisms being capable of growing in a nutrient medium containing hydrocarbons, for example, n-paraffins having about 9 to 30 carbon atoms, including mixtures of crude fractions containing said hydrocarbons.

The bacteria which is capable of assimilating the hydrocarbons and growing in the aqueous nutrient medium thereby producing large quantities of α-ketoglutaric acid are found in a wide number of species and genera. From the inventors' investigations and identifications, strains having particularly strong α-ketoglutaric acid-producing capabilities are those belonging to the genera Cornyebacterium, Brevibacterium, Arthrobacter and Micrococcus. These strains are not substantially influenced by the number of carbon atoms in the hydrocarbon material and thus are capable of producing α-ketoglutaric acid from any of the hydrocarbons, for example, n-paraffins having about 9 to 30 carbon atoms.

The bacteriological characteristics of these newly isolated strains are described below according to Bergey's Manual of Determinative Bacteriology, 7th Edition.

*Brevibacterium ketoglutamicum* No. 2473 ATCC 15588

A. Morphological characteristics:
  Size ............................ Rods, 0.7–0.9μ x 0.8–3.0μ, long cells are rarely observed. Spore not formed.
  Motility ........................ Non-motile.
  Gram stain ...................... Gram positive.
B. Cultural characteristics:
  i. Nutrient agar colonies ...... Punctiform, smooth, entire, opaque, glistening.
  ii. Nutrient agar slant ........ Moderate growth, filiform, glistening, pink orange, butyrous.
  iii. Nutrient broth ............ Slightly turbid, membranous on the surface, compact sediment.
C. Physiological characteristics:
  1. Optimum temperature ......... 25°–37° C., extremely good growth at 37° C.
  2. Optimum pH .................. 6.0–8.0.
  3. Oxygen requirement .......... Aerobic, or facultative anaerobic.
  4. Litmus milk .................. Not changed or alkaline.
  5. Gelatin ...................... Not liquefied.
  6. Hydrogen sulfide ............. Not produced.
  7. Indole ....................... Do.
  8. Starch ....................... Not hydrolyzed.
  9. Nitrate ...................... Reduced to nitrate.
  10. Catalase .................... Positive.
  11. Urease ...................... Do.
  12. Hydrocarbon fermentation .... The strain grows well consuming n-paraffin as the sole source of carbon and produces -keto-glutaric acid, glutamic acid and alanine.
  13. Utilizability of carbohydrates. Feeble production of acids from glucose, fructose and sucrose, and does not utilize maltose.

Micrococcus paraffinolyticus No. 41 ATCC 15589

A. Morphological characteristics:
- Form: Spheres or short rods.
- Size: 0.8–1.2μ x 0.8–1.4μ.
- Motility: Non-motile.
- Gram stain: Gram positive.

B. Cultural characteristics:
- i. Nutrient agar colonies: Scanty growth.
- ii. Nutrient agar slant: Scanty growth, filiform, glistening, light red or red orange, butyrous.
- iii. Nutrient broth: Slightly turbid, compact sediment.

C. Physiological characteristics:
1. Optimum temperature: 25°–37° C.
2. Optimum pH: 6.0–8.0.
3. Oxygen requirement: Aerobic, facultatively anaerobic.
4. Litmus milk: Not changed.
5. Gelatin: Not liquefied.
6. Hydrogen sulfide: Not produced.
7. Indole: Do.
8. Starch: Not hydrolyzed.
9. Nitrate: Reduced.
10. Catalase: Positive.
11. Urease:
12. Hydrocarbon fermentation: The strain grows well consuming n-paraffin as the sole source of carbon and produces amino acids and organic acids, particularly α-ketoglutaric acid.
13. Utilizability of carbohydrates: Favorable production of acids from fructose, feeble production of acids from glucose and maltose, no production of acid from sucrose.

Arthrobacter parafineus No. 2411 ATCC 15591

A. Morphological characteristics:
- Size: Rods generally 0.8–1.2μ x 1–3μ. Cells vary in size and shapes, irregular forms, curves, swollen or branching. Elongated cells and coccoid cells are also observed.
- Motility: Non-motile.
- Gram stain: Gram variable. In general, elongated cells exhibit gram-negative, coccoid cells gram positive.

B. Cultural characteristics:
- i. Nutrient agar colonies: Abundant growth, circular, smooth, entire pale yellowish brown, opaque, glistening.
- ii. Nutrient agar slant: Abundant growth, filiform, raised or flat, glistening, pale yellow to grayish brown, butyrous.
- iii. Nutrient broth: Slightly turbid, slightly flaky sediment.

C. Physiological characteristics:
1. Optimum temperature: 20°–30° C., slight growth at 37° C.
2. Optimum pH: 6.0–8.0.
3. Oxygen requirement: Aerobic, facultatively anaerobic.
4. Litmus milk: Not changed or alkaline.
5. Gelatin: Not liquefied.
6. Hydrogen sulfide: Not produced.
7. Indole: Do.
8. Starch: Not hydrolyzed.
9. Nitrate: Not reduced to nitrite.
10. Catalase: Positive.
11. Urease: Do.
12. Hydrocarbon fermentation: The strain grows well consuming n-paraffin as the sole source of carbon and produces large amounts of glutamic acid from n-paraffin or acetic acid.
13. Utilizability of carbohydrates: Production of acids from fructose and mannit. When acetic acid or n-paraffin is used as the source of carbon in Hooker medium, $NH_4H_2PO_4$ are not utilized as a nitrogen source.

Corynebacterium hydrocarbolastus

The bacteriological characteristics of the above microorganism are described below (this has been disclosed in lines 26 to 69, column 4 of the specification of U.S. Pat. No. 3,222,258):

Rods, 0.8 x 3.0 microns. Coccoid forms and branching are rarely observed. Spore not formed. Non-motile. Not acid-fast. Gram-positive.

Nutrient agar colonies: Circular, smooth or finely wrinkled, raised to convex, entire, light rose color, opaque, butyrous.

Nutrient agar slant: Moderate growth, filiform, glistening or dull, smooth or wrinkled, light rose color.

Nutrient broth: Fragile pellicle.

Nutrient gelatin stab: No liquefaction.

Milk: Unchanged.

B.C.P. milk: Alkaline, not peptonized.

Potato: Moderate growth.

Nitrates are not reduced to nitrites.

Nitrate respiration: Negative.

Indole not produced.

Acetylmethyl carbinol not produced.

Hydrogen sulfide produced.

(Variation: Some strains do not produce $H_2S$.)

Starch not hydrolyzed. (Variation: Some strains hydrolyze starch.)

Acid but no gas from glucose.

Aerobically acid is produced from glucose according to Hugh and Leifson's method.

No acid nor gas from xylose, sucrose, lactose and starch.

Glucose, gluconate, citrate, succinate, p-hydroxybenzoate and protocatechuate are utilized as a sole source of carbon. Utilization of benzoate varies with strains. Salicylate, m-hydroxy-benzoate, gentisate and anthranilate are not utilized as a sole source of carbon.

Kerosene, n-decane, n-undecane, n-dodecane, n-tetradecane, and n-cetane are utilized as a sole source of carbon.

Optimum temperature: 25° C. to 30° C. Scant growth or no growth at 37° C.

Catalase: Positive.

Habitat: Soil.

Cory. hydrocarboclastus was identified as new species by Iizuka and Komagata, and reported to the 188th meeting of the Kanto branch of the Agricultural Chemical Society of Japan.

As for the fermentation per se, either a synthetic culture medium or a natural nutrient medium is suitable as long as it contains the essential nutrients for the growth of the microorganism strain employed. Such nutrients are well known in the art and include substances such as a carbon source, a nitrogen source, inorganic compounds and the like which are utilized by the microorganism employed in appropriate amounts.

The fermentation in connection with the present invention is conducted in an aqueous nutrient medium containing a hydrocarbon or a mixture of hydrocarbons as the main carbon source. Such hydrocarbons include straight and branched-chain paraffins (alkanes) having about 9 to 30 carbon atoms, such as for example, n-nonane, n-decane, isodecane, n-undecane, n-dodecane, n-tetradecane, n-hexadecane, n-octadecane, isooctadecane, n-docosane, n-triacontane, etc., cycloparaffins such as cyclododecane and decalin, straight and branched-chain olefins such as nonene, decene, dodecene, etc., aromatic hydrocarbons such as naphthalene, tetralin, anthracene, etc., and mixtures thereof and mixed hydrocarbons such as kerosene, light oils, heavy oils, naphtha, paraffin oils, etc. Small amounts of other carbon sources such carbohydrates, for example, glucose, fructose, maltose, sucrose, starch, starch hydrolysate, molasses, etc., or any other suitable carbon source such as glycerol, mannitol, sorbitol, organic acids, etc., may be used in the fermentation medium along with the hydrocarbon. These substances may be used either singly or in mixtures of two or more.

As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as cornsteep liquor, yeast extract, meat extract, fish meal, peptone, bouillon, casein hydrolysates, fish solubles, rice bran extract, etc. may be employed. These substances may also be used either singly or in combination of two or more.

Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc. The addition of calcium carbonate to the fermentation medium is particularly effective in increasing the accumulation of α-ketoglutaric acid. It may also be necessary to add certain essential nutrients to the culture medium, depending upon the particular microorganism employed, such as amino acids, for example, aspartic acid, threonine, methionine, etc., and/or vitamins, for example, biotin, thiamine, cobalamin, and the like. Of the vitamins mentioned, thiamine is particularly effective in improving the yield of α-ketoglutaric acid.

Fermentation is conducted under aerobic conditions, such as aerobic shaking of the culture or with stirring of a submerged culture, at a temperature of about 20° to 50° C. and a pH of about 4 to 9. After about one to five days of culturing under these conditions, remarkably large amounts of α-ketoglutaric acid are found to be accumulated in the fermentation liquor.

After the completion of fermentation, the α-ketoglutaric acid may be separated from the culture liquor by conventional means, such as ion exchange resin treatment, precipitation with metallic salts, chromatography, or the like.

The following examples are given merely as illustrative of the present invention and are not to be considered as limiting. Unless otherwise noted, the percentages therein are by weight.

EXAMPLE 1

Three liters of the following culture medium are prepared in a 5 liter jar fermentor and then sterilized.

|  | Percent |
|---|---|
| $K_2HPO_4$ | 0.2 |
| $MgSO_4 \cdot 7H_2O$ | 0.1 |
| $MnSO_4 \cdot 4H_2O$ | 0.002 |
| $FeSO_4 \cdot 7H_2O$ | 0.02 |
| $NH_4NO_3$ | 2.0 |
| $CaCO_3$ | 3.0 |
| Cornsteep liquor | 0.01 |

The pH of this medium is 7.2.

To this sterilized medium is added 200 grams of a mixture of n-paraffins having 12 to 14 carbon atoms. *Arthobacter paraffineus* No. 2411 ATCC 15591, previously cultured with aerobic shaking in a bouillon medium for 24 hours is inoculated in the ratio of 10% by weight into the above fermentation medium. Culturing is then carried out under aerobic conditions with stirring at a rate of 700 r.p.m. while simultaneously passing sterilized air through the medium at 30° C. for 72 hours. After 24 hours of culturing, 100 grams of a mixture of n-paraffins containing 12 to 14 carbon atoms are added. After 72 hours of culturing the accumulated concentration of α-ketoglutaric acid is measured and found to be 60 g./l. The α-ketoglutaric acid thus produced is separated by passing the mixture through an ion exchange resin. 120 grams of α-ketoglutaric acid crystals are obtained.

EXAMPLE 2

A cultivation similar to that of Example 1 is carried out by adding 100 grams of a mixture of n-paraffins having 12 to 16 carbon atoms at the beginning of the cultivation. However, no paraffin was added after 24 hours of cultivation. The accumulated concentration of α-ketoglutaric acid is 15 g./l.

EXAMPLE 3

A cultivation similar to that of Example 2 is carried out by using 100 grams of a crude n-paraffin material containing 90% of n-paraffins having 11 to 18 carbon atoms. 30 grams of α-ketoglutaric acid crystals are obtained.

EXAMPLE 4

A cultivation similar to that of Example 3 is carried out by using 200 grams of kerosene and cultivating for 72 hours. The accumulated concentration of α-ketoglutaric acid is 18 grams per liter.

The following example shows the accumulated concentrations of α-ketoglutaric acid in grams per liter produced using strains belonging to the genera corynebacterium, Brevibacterium, Arthrobacter and Micrococcus.

EXAMPLE 5

Three liters of the following fermentation medium is prepared in a five liter jar fermentor and then sterilized:

|  | Percent |
|---|---|
| $K_2HPO_4$ | 0.2 |
| $MgSO_4 \cdot 7H_2O$ | 0.1 |
| $MnSO_4 \cdot 4H_2O$ | 0.002 |
| $FeSO_4 \cdot 7HO$ | 0.02 |
| $NH_4NO_3$ | 2.0 |
| $CaCO_3$ | 2.0 |
| Cornsteep liquor | 0.01 |

The pH of this medium is 7.2.

To the sterilized fermentation medium is added 5% n-dodecane. The fermentation medium is divided into 20 milliliter portions and each portion is poured into a 500 milliliter volume Sakaguchi flask. The seed cultures, i.e., *Corynebacterium hydrocarboclastus* No. 4238 ATCC 15592, *Brevibacterium ketoglutamicum* No. 2473 ATCC 15588, *Micrococcus paraffinolyticus* No. 41 ATCC 15589 and *Arthrobacter paraffineus* No. 2411 ATCC 15591, previously cultured with aerobic shaking in a bouillon at 30° C. for 24 hours is inoculated by adding 1 to 2 milliliter portions of each bacterial strain to the 20 milliliter portions of the fermentation media. Culturing is then carried out under aerobic conditions in a reciprocating shaker at 30° C. for 72 hours. The accumulated concentrations caused by the various bacterial strains are observed and listed in the following table.

| Designations of bacterial strains | Accumulated concentration of α-ketoglutaric acid (g./l.) | Yields with n-dodecane (percent) |
|---|---|---|
| *Arthrobacter paraffineus* No. 2411 ATCC 15591 | 25.0 | 50 |
| *Corynebacterium hydrocarboclastus* No. 2438 ATCC 15592 | 11.0 | 22 |
| *Brevibacterium ketoglutamicum* No. 2473 ATCC 15588 | 8.0 | 16 |
| *Micrococcus parafinolyticus* No. 41 ATCC 15589 | 9.0 | 18 |

The above table shows that up to 50% of the paraffin utilized can be accumulated in the fermentation medium as α-ketoglutaric acid. Although the examples indicate that the preferred hydrocarbons are n-paraffins having 9 to 30 carbon atoms, it is clear from the specification that hydrocarbons other than n-paraffins are effective as the main carbon source.

Since modifications of this invention will be apparent to those skilled in the art, it is not desired to limit the invention to the exact constitution shown and described. Accordingly, all suitable modifications and equivalents may be resorted to which fall within the scope thereof.

We claim:

1. A process for producing α-ketoglutaric acid which comprises culturing a microorganism selected from the group consisting of *Corynebacterium hydrocarboclastus* ATCC 15592, *Brevibacterium ketoglutamicum*, *Micrococcus paraffinolyticus* and *Arthrobacter paraffineus* in an aqueous nutrient medium under aerobic condtions in the presence of at least one hydrocarbon as the main carbon source, accumulating α-ketoglutaric acid in the resultant liquor and isolating the α-ketoglutaric acid therefrom.

2. A process for producing α-ketoglutaric acid which comprises culturing a microorganism selected from the group consisting of *Corynebacterium hydrocarboclastus* ATCC 15592, *Brevibacterium ketoglutamicum*, *Micrococcus paraffinolyticus* and *Arthrobacter paraffineus* in an aqueous nutrient medium under aerobic conditions in the presence of at least one n-paraffin having 9 to 30 carbon atoms and isolating the α-ketoglutaric acid from the medium.

3. The process of claim 1, wherein the microorganism is *Corynebacterium hydrocarboclastus* No. 2438, ATCC 15592.

4. The process of claim 1, wherein the microorganism is *Brevibacterium ketoglutamicum* No. 2473 ATCC 15588.

5. The process of claim 1, wherein the microorganism is *Micrococcus paraffinolyticus* No. 41 ATCC 15589.

6. The process of claim 1, wherein the microorganism is *Arthrobacter paraffineus* No. 2411 ATCC 15591.

7. The process of claim 1, wherein said hydrocarbon is kerosene.

8. The process of claim 1, wherein said hydrocarbon is selected from the group consisting of n-paraffins and mixtures thereof.

9. The process of claim 1, wherein calcium carbonate is added to the aqueous nutrient medium.

10. The process of claim 1, wherein thiamine or a derivative thereof is added to the aqueous nutrient medium.

11. The process of claim 2, wherein the microorganism is cultured under aerobic conditions at a temperature of about 20° to 50° C. and a pH of about 4 to 9.

12. The process of claim 2, wherein said aqueous nutrient medium contains a member selected from the group consisting of calcium carbonate, thiamine and mixtures thereof.

13. The process of claim 2, wherein the microorganism is selected from the group consisting of *Corynebacterium hydrocarboclastus* No. 2438 ATCC 15592, *Brevibacterium ketoglutamicum* No. 2473 ATCC 15588, *Micrococcus paraffinolyticus* No. 41 ATCC 15589 and *Arthrobacter paraffineus* No. 2411 ATCC 15591.

14. The process of claim 1, wherein the hydrocarbon is added to the medium prior to the initiation of culturing.

15. The process of claim 1, wherein the hydrocarbon is added to the medium during culturing.

References Cited

UNITED STATES PATENTS

| | | | |
|---|---|---|---|
| 3,087,863 | 4/1963 | Lee et al. | 195—47 |
| 3,120,472 | 2/1964 | Dunn | 195—47 |
| 3,201,323 | 8/1965 | Douros et al. | 195—1 |
| 3,222,258 | 12/1965 | Iizoka et al. | 195—29 |
| 3,254,002 | 5/1966 | Megna et al. | 195—47 |

OTHER REFERENCES

Shiio et al., Journal of General Applied Microbiology, vol. 9, No. 1 (1963), pp. 23–30.

LIONEL M. SHAPIRO, Primary Examiner